United States Patent

[11] 3,577,903

| [72] | Inventor | Walter S. Eggert, Jr.<br>Huntingdon Valley, Pa. |
| --- | --- | --- |
| [21] | Appl. No. | 889,196 |
| [22] | Filed | Dec. 30, 1969 |
| [45] | Patented | May 11, 1971 |
| [73] | Assignee | The Budd Company<br>Philadelphia, Pa. |

[54] HANDRAIL AND AIR-CONDITIONING DUCT SUPPORT
3 Claims, 5 Drawing Figs.

[52] U.S. Cl. .................................................... 98/2, 98/10, 98/14, 296/28
[51] Int. Cl. ..................................................... B60h 1/24
[50] Field of Search .......................................... 98/8, 10, 13, 14, 2, 2.5, 2.4; 296/28 (A); 62/243, 244

[56] References Cited
UNITED STATES PATENTS

| 2,476,368 | 7/1949 | Guernsey | 98/10 |
| --- | --- | --- | --- |
| 3,151,538 | 10/1964 | Dean | 98/10 |
| 3,159,089 | 12/1964 | Eggert | 98/14 |

*Primary Examiner*—Meyer Perlin
*Attorneys*—Thomas I. Davenport, Edward M. Farrell, John D. Sowell, Alford L. Trueax, Jr. and William R. Nolte ABSTRACT: A support member providing support for a vehicle handrail and an air-conditioning duct. The support member passes through the air duct and is designed to minimize air turbulence.

Patented May 11, 1971

INVENTOR.
Walter S. Eggert, Jr.
BY

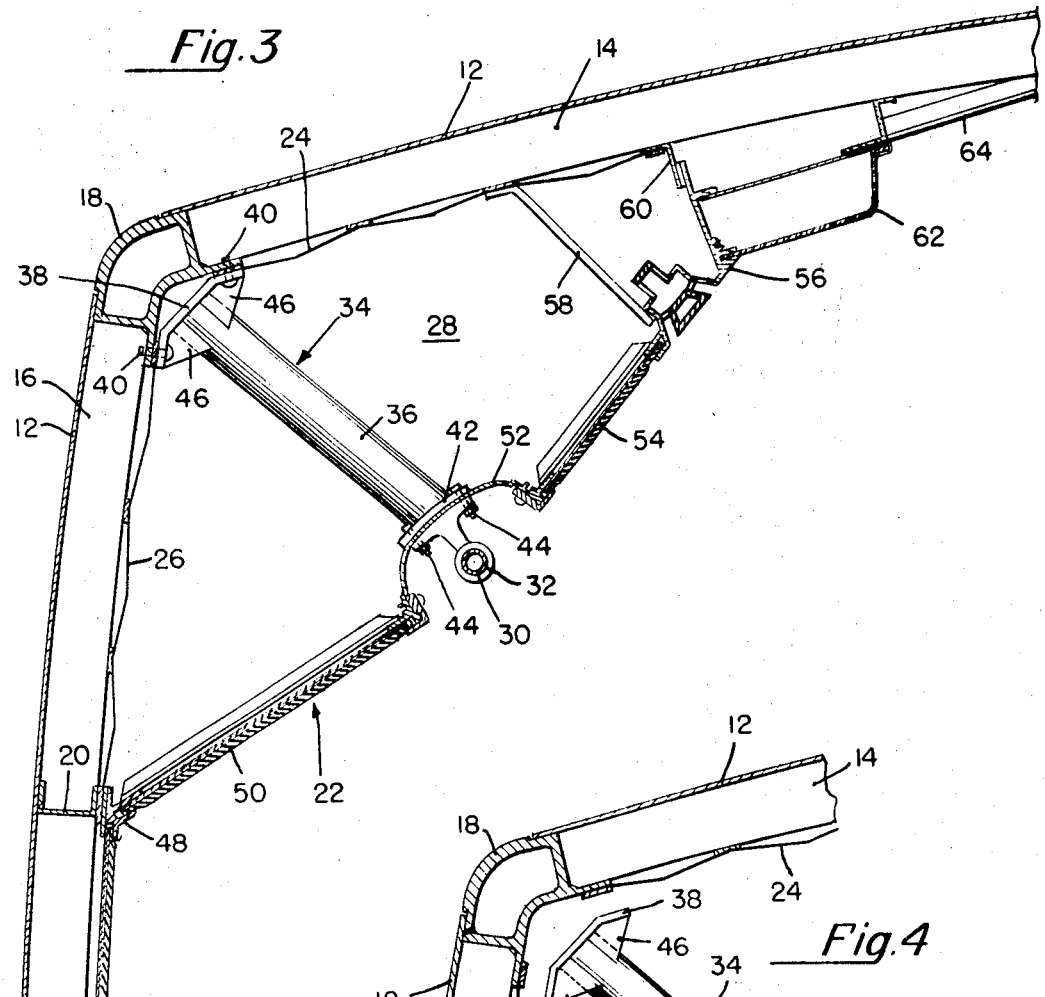
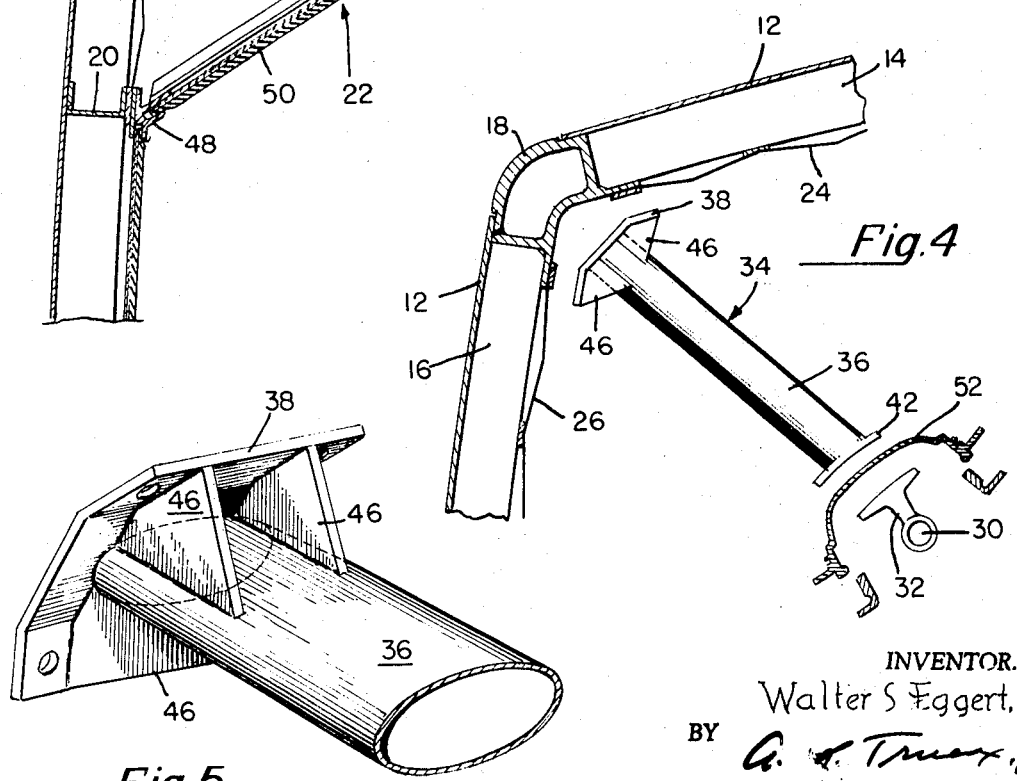
INVENTOR.
Walter S Eggert, Jr.
BY

HANDRAIL AND AIR-CONDITIONING DUCT SUPPORT

This invention relates to interior supports for a vehicle body and more particularly to supports serving the duct function of supporting a handrail and a portion of an air-conditioning duct.

The modern vehicles used for transporting a large number of passengers such as buses or train cars have increasingly utilized area air conditioning to increase passenger comfort. The ducts for conducting the conditioned air are often located along the floor or in the sidewalls adjacent the floor. In such locations, the support of the air duct does not present a problem. An object of the present invention is to place the air ducts along the upper corner of the vehicle body and provide a novel support means therefor.

In multiple passenger vehicles such as a bus, sometimes it is necessary for some of the passengers to stand during motion of the vehicle and handrails are provided for the standing passengers to grasp. Another object of this invention is to utilize the support bracket for the air duct to also support a handrail for standing passengers.

These and other objects of this invention as well as various novel features and advantages will become apparent as reference is made to the following specification and drawings, wherein:

FIG. 3 is an enlarged view substantially along the line 3–3 of FIG. 2 in the direction of the arrows, showing the support member connected to the vehicle body and supporting the handrail and air duct;

FIG. 4 is an exploded view of the support member, handrail and air duct attaching member of FIG. 3;

FIG. 5 is an enlarged perspective view of the body and of the support member.

Figure 1:
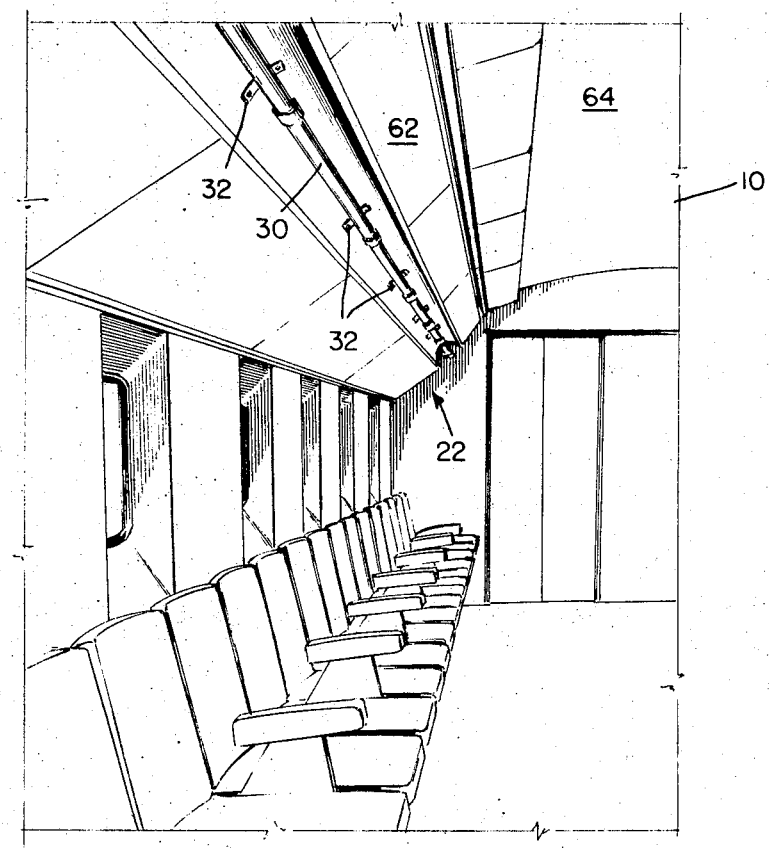
FIG. 1 is a persepective view of the interior of a multiple passenger carrying vehicle.
Figure 2:
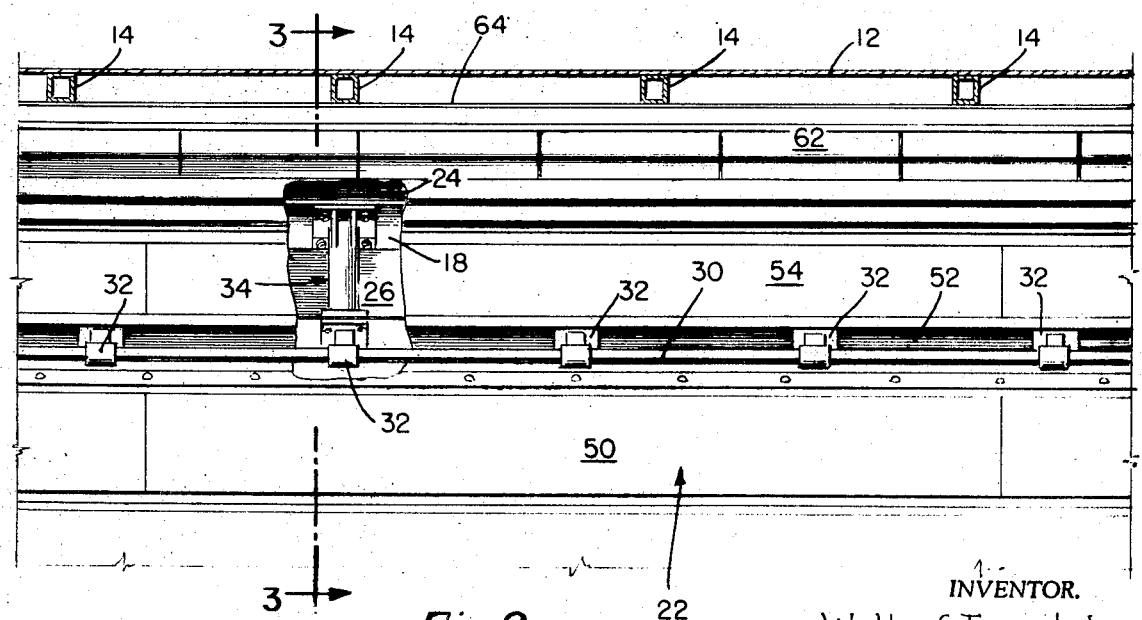
FIG. 2 is a side view of the upper corner of the vehicle body with sections cut away to show the air duct, handrail and a support member.

Referring to the drawings, as best seen in FIGS. 1, 2 and 3, a vehicle body 10 having an outer skin 12 mounted on a body frame structure including roof carlines 14 and side posts 16 connected at the corner to an upper outer stringer 18. A plurality of siderails 20 extend between the side posts 16.

Extending between the side posts 16 and the roof carlines 14 and spaced from the corner stringer 18 is an air-conditioning wall, indicated generally by the numeral 22. Insulation panels 24, 26 extend from the outer stringer 18 to the respective intersections of the wall 22 with the carlines 14 and side posts 16, thus forming an air-conditioning duct 28 between the wall 22, the side posts 16 and the carlines 14.

A handrail 30 is positioned adjacent the wall 22 by a plurality of handrail supports 32 extending between the wall 22 and the handrail 30.

A plurality of support members 34 for supporting the handrail 30 and air-conditioning wall 22 are positioned within the air-conditioning duct. Each support member 34 includes a center oval tubular section 36 with an end plate 38 on one end secured to the upper outer stringer 18 by bolts 40 or other suitable means and a second end plate 42 on the other end secured to the wall 22 and a handrail support member 32 by bolts 44 or other suitable means. The end plates 38, 42 may be joined to the oval tube 36 by welding or other suitable means. Reinforcement ribs 46 may be secured between the end plate 38 and the tube 36 is desired for strengthening the connection between the end plate and the tubular section.

The air-conditioning wall 22 includes a side longitudinal molding 48 secured to the side posts 16 and supporting the lower edge of a lower panel 50. The upper edge of panel 50 is secured to the lower edge of a handrail shield 52. The handrail shield is sandwiched between the handrail supports 32 and the support member 34 and is held there by the bolts 44. The upper edge of the handrail shield 52 is secured to and supports the lower edge of an upper panel 54. The upper edge of the upper panel 54 is supported on a longitudinally extending air diffuser 56 that is secured to the roof carlines 14 by a plurality of support straps 58 and a roof angle 60 that has one arm secured to the roof carlines 14 and the other to the air diffuser 56.

To complete the interior trim adjacent the wall 22, light fixtures 62 extend between the air diffuser 56 and the interior roof trim panels 64.

The novel support member 34 is placed in the air-conditioning duct 28 so that the narrow portion of the oval cross section is in the path of the airflow and creates the least resistance to the flow of the air. The support member 34 provides support for the middle of the wall 22 and also for weight imposed on the handrail 30.

I claim:

1. In combination in a vehicle body, a body frame, skin structure secured to said frame for enclosing said vehicle body, an air-conditioning wall having the edges thereof secured to said frame, an air-conditioning duct formed between said wall, said frame and said skin structure, a support strut extending between said frame and said wall through said air-conditioning duct, said support structure having one end secured to said frame and the other end secured to said wall intermediate said edges for supporting said wall, and a handrail spaced inwardly of said wall, said handrail secured to and supported by said other end of said support strut.

2. The vehicle body structure as claimed in claim 1 including insulation panels secured to the inner edge of said frame for forming an insulated air-conditioning duct.

3. The vehicle body structure as claimed in claim 2 including an air diffuser formed as a portion of said wall for releasing air within said air-conditioning duct into the interior of said vehicle.